July 8, 1952   R. E. COMTE   2,602,271
DEVICE FOR GATHERING GLASS BY SUCTION FROM GLASS FURNACES
Filed March 9, 1949   3 Sheets-Sheet 3
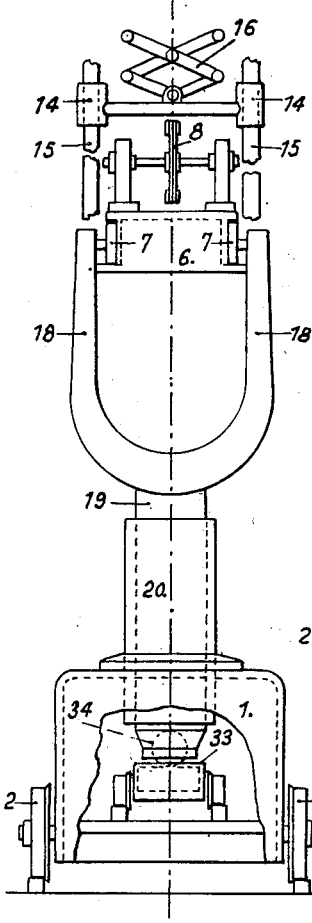
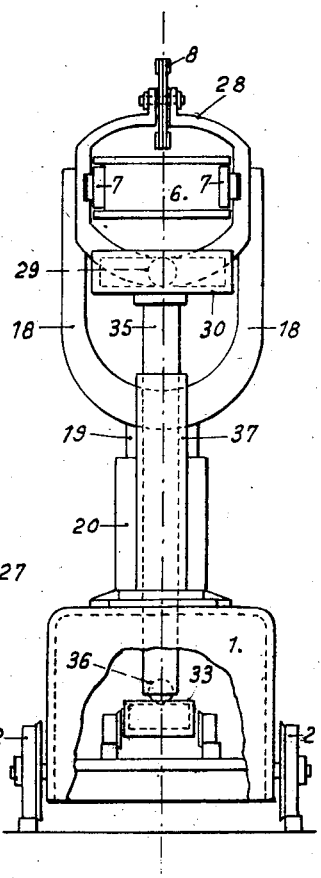
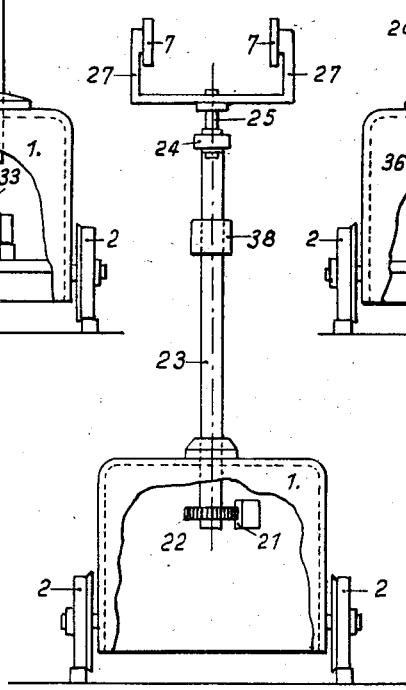
Inventor
Robert Ernest Comte
by Pennie, Edmonds, Morton and Barrows
Attorneys

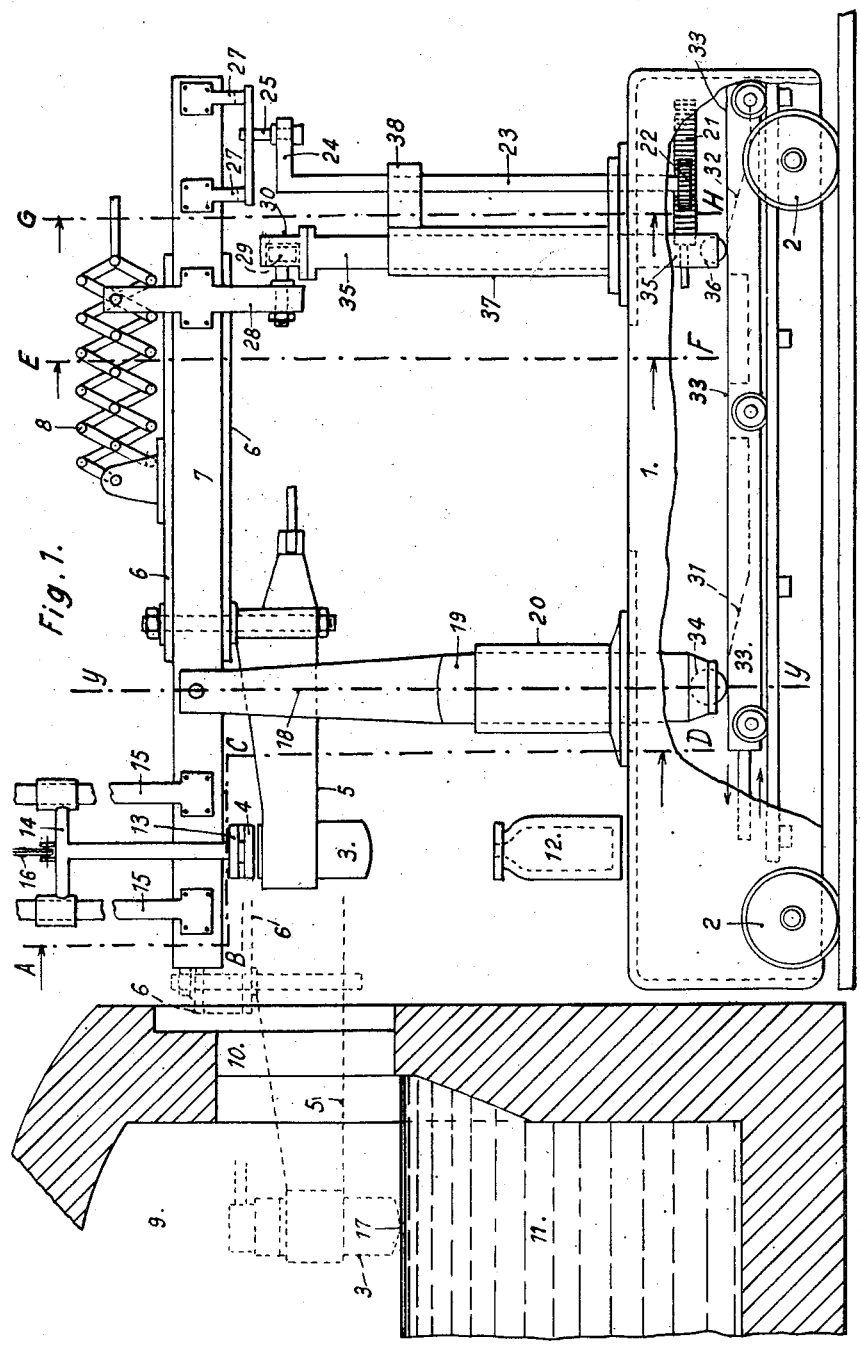

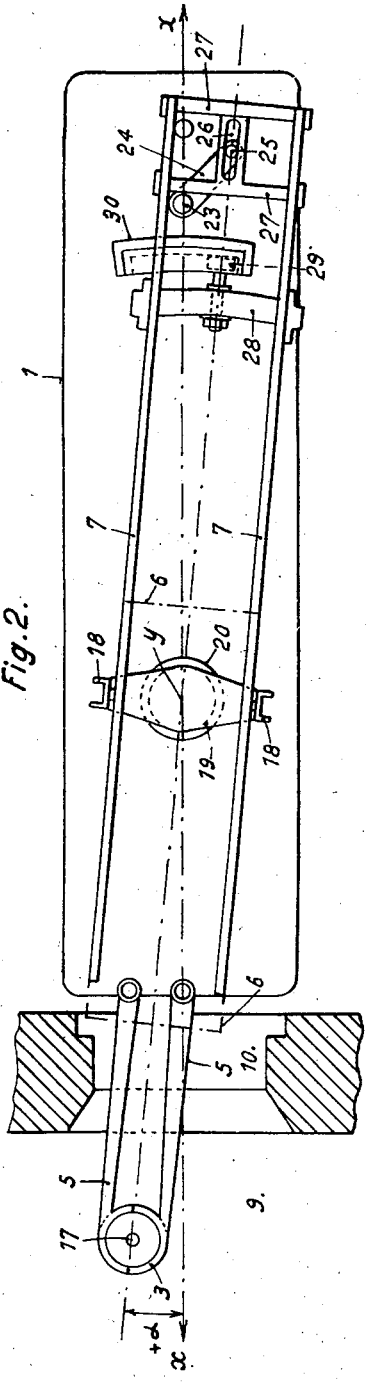
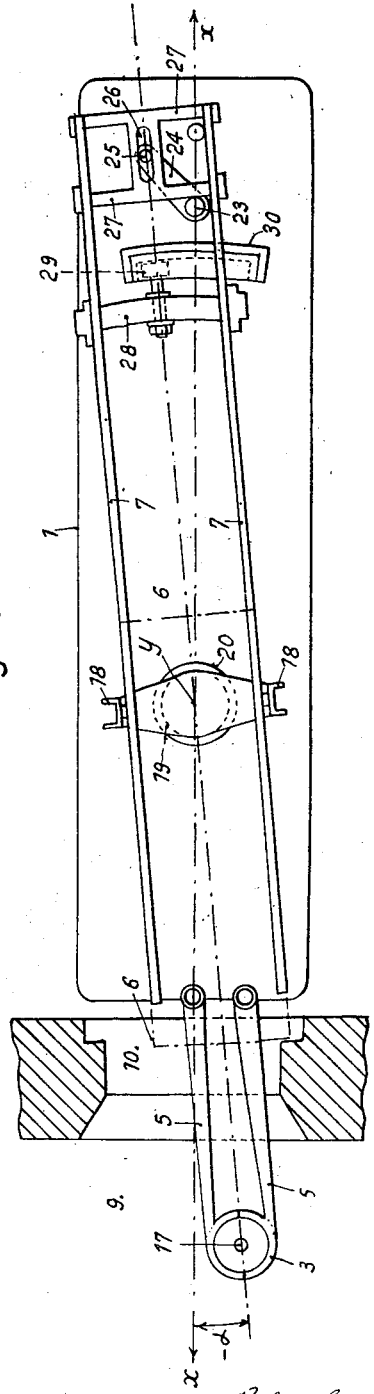

Patented July 8, 1952

2,602,271

UNITED STATES PATENT OFFICE 2,602,271

DEVICE FOR GATHERING GLASS BY SUCTION FROM GLASS FURNACES

Robert Ernest Comte, Clarens, near Montreux, Switzerland, assignor to Developpements et Creations d'Appareils Industriels S. A., Lausanne, Switzerland, a corporation of Switzerland Application March 9, 1949, Serial No. 80,372
In Switzerland September 16, 1948

2 Claims. (Cl. 49—62)

My invention relates to the machines which are used for the manufacture of hollow glass articles, such as bottles and flasks, and in which in a general manner the cycle of manufacture mainly comprises gathering a parison by sucking the molten glass by means of a parison mould, transferring said parison to a finishing mould, for example by means of a neck or ring mould, and finally blowing said parison in the finishing mould into the final shape of the article to be manufactured.

In this family of machines, of which various types are known that differ by the movements imparted to the various moulds or groups of moulds, experience has shown that the repetition of the gathering of the glass produces in the gathering zone, after some time, a change in the glass which is more or less pronounced and impairs the quality of the manufactured articles and even their strength, since it creates internal strains in the glass after the blown article has cooled.

This change, which has been found to be essentially a lack of homogeneity, has already been counteracted by means of various practices. In particular, attempts have been made to overcome these difficulties by means of a rotating pot which is made of sufficiently large size, or the rhythm of rotation of which is suitably calculated to leave, in principle, the glass the necessary time to become re-heated between two successive gatherings.

On the other hand, when they were designed, the so-called "unit" machines, wherein the gathering mould or moulds penetrate into a melting furnace, were believed to have overcome the difficulties due to the change in the glass at the gathering point, but it had to be admitted that these machines were also to a certain extent subject to the aforesaid drawbacks owing to the repeated contacts between the base of said moulds and the same surface of the glass in the furnace and also to the cooling produced by opening the gathering hole.

Furthermore, it has also been proposed to make it possible to move the gathering point systematically, by widening the opening through which the sucking members penetrate into the furnace, but it would appear that this solution is also imperfect, if only because it necessarily accentuates the cooling effect which has just been mentioned.

The object of my invention is to give the glass which has been changed by its contact with the base of a gathering member, the time to recover its thermic homogeneity by re-heating, without however, on the one hand the time allowed for such re-heating to affect the speed of output of the machine, and on the other hand the means used being costly owing to the masses to be moved, or criticizable for any technical reason. In this respect, my invention has the remarkable feature of not requiring any abnormal enlargement of the opening through which the gathering members penetrate into the furnace.

In its principle, the invention comprises imparting to the gathering mould, as soon as it has penetrated into the furnace, an angular movement which is associated with its penetrating movement and which is effected alternately, for each successive gathering, on one side and then on the other side of the axis of the hole, opposite which the machine is installed.

Owing to this movement, on the one hand each of the two gathering zones or points is left untouched and is re-heated during the entire period, not between two, but between three successive gatherings, and on the other hand the gathering hole retains its normal width, and finally the composite movement imparted to the mould can be obtained mechanically by very simple means which leave intact, without substantially increasing its weight, the usual structure of the type of machines in question.

According to another and complemental feature of my invention, the downward and upward movement of the parison mould for the gathering operation, which movement may begin either during the angular movement of the mould, or only after said angular movement has been completed, is effected by a vertical translation proper of the mould and not by inclining or rocking same, as in the known machines.

Consequently, whereas in such known machines the front of the parison mould has to be immersed more deeply than the rear during the gathering operation, so that the opening in the base of the mould is immersed in the body of the glass and filling can be effected, thereby contributing to increase the lack of thermic homogeneity, since the mass of glass is unequally affected by the cooling contact of the mould, on the contrary the absolutely vertical translation which is imparted to said mould for the gathering, according to the invention, enables the contact to be reduced to a mere and moreover uniform touch of the surface of the glass by the base of the mould, without any substantial and uneven penetration of the mould into the glass.

My invention is illustrated in the accompanying drawing which shows the application thereof in the case of a so-called unit machine, which comprises a single parison mould supported at the end of an arm adapted to penetrate into the furnace, but it is of course to be understood that this application, which is only given by way of example, is absolutely non-limitative and that all the constructional details may be varied without exceeding the scope of the invention if the kinematic features thereof are present in the machine.

In the drawing:

Fig. 1 is an elevational view of the machine without any actuating or other members which are not essential for the comprehension of the invention.

Figs. 2 and 3 are two diagrammatic plan views, illustrating two successive gatherings on either side of the common axis of the gathering hole and the machine.

Figs. 4, 5 and 6 correspond to diagrammatic transverse sections taken respectively along A—B—C—D, and E—F, and G—H, Fig. 1.

These figures show the essential elements or members of the machines of the type in question, viz, the framework 1 supported by wheels 2, the parison mould 3 surmounted by a ring or neck mould 4, said parison mould being mounted by means of mould-support 5 on a carriage 6 which is adapted to move along guide-bars 7—7 and is actuated by a lazy-tongs device 8 in such a manner as to cause the parison mould 3 to penetrate into the furnace 9 through the hole 10 and withdraw from said furnace after it has gathered a parison from the mass of molten glass 11. The transfer of said parison to the finishing mould 12 is effected, as known, by means of a ring mould support 13 that co-operates with a frame 14 adapted to slide along guides 15 by the action of a lazy-tongs device 16, in such a manner that, according to a procedure known per se, the ring mould opens when the finishing mould has closed on the parison, thereby liberating the ring mould for the next gathering operation and simultaneously enabling said parison to be blown in the finishing mould, either by means of a bell, by compressed air, or by vacuum action, while the blank or parison mould closes round the ring or neck mould, and both these moulds can then again be propelled as a unit towards the furnace by the action of the device 8.

The elements of the apparatus described above are generally known in the art and in such apparatus the neck mould 4 is associated with the parison mould 3 for the dipping of the parison in the furnace 9 and it accompanies the mould 3, which it overlies, in the movement of the latter from the position outside the furnace (shown in full lines in Fig. 1) to the position in the furnace (shown in dotted lines in the same figure). It may be explained that the annular mould carrier 13 is supported by the downwardly-extending portion of the frame 14, which in turn, is movable vertically by the lazy-tongs device 16. The cross piece of the frame 14 includes sleeves which slide along the guides 15 secured to the guide bar 7. The parison mould 3, as generally known, comprises two half shells, which are operated closed inside the furnace and are opened outside the furnace to release the parison. As soon as the parison mold 3 has returned to its rest position outside the furnace, the two half shells open and free the parison, which remains suspended by the neck mould 4. When the portions of the mould 3 are separated, the neck mould with the parison is movable towards the finishing mould 12, this being accomplished by the extension of the lazy-tongs device 16. It may be also explained that the finishing mould 12 comprises two half moulds, which are separated to receive the parison, after which they are closed over the parison which is released by the neck mould to be blown therein to the desired shape. After this operation, the neck mould 4 is elevated by the contraction of the lazy-tongs device 16 until it returns to the level of the parison mould 3, which closes around the neck mould ready for the next dipping operation.

The lazy-tongs device 8 is used to reciprocate the carriage 6, since one end of the lazy-tongs is attached to a bracket mounted on the carriage 6. The second pivot point from the right of the lazy-tongs is pivoted to the upper portion of the stirrup member 28. The operation of the lazy-tongs is effected by reciprocating the shaft connected to the right-hand end of the device.

Having thus explained this general structure of a known machine, my invention comprises providing means which enable an angular displacement of $\pm a$, Figs. 2 and 3, about a vertical axis $y$—$y$, Fig. 1, to be imparted to the parison mould 3, on either side of the axis $x$—$x$, Fig. 2, which is common to the machine and the gathering orifice of the furnace (Figs. 1, 2, and 3), in such a manner that the gathering orifice 17 of said mould gathers the glass alternately in zones located on the right and on the left of the axis $x$—$x$.

For this purpose, and according to the practical embodiment illustrated by way of example, the bars 7—7 that guide the carriage 6 are supported by a fork 18 secured to a tubular column 19 which is adapted to rotate on its axis and reciprocate vertically inside a tubular base 20 secured to the framework 1 of the machine. This rotating movement is produced at the opportune instants, i. e. preferably as soon as the parison mould 3 has penetrated into the furnace, by the reciprocating action of a rack 21 and a pinion 22 secured to a shaft 23, the crank 24 of which actuates a head 25 which is adapted to move in the slot 26 of a double stirrup 27—27 secured to said bars.

During the pivoting movement of the bars 7—7, and also when stationary, said bars are guided and supported by a stirrup 28 that supports a roller 29 which is adapted to move in a race 30.

Under these conditions, the even numbered gatherings are effected, for example, in a zone located on the right of the axis $x$—$x$, facing the gathering orifice 10 (Fig. 2), and the odd numbered gatherings on the left of said axis (Fig. 3). Consequently the glass, which has been changed by its contact with the base of the parison mould during a gathering operation, for example an even numbered gathering, has time to recover the original temperature before coming into contact again with said mould since, meanwhile, the same will have effected an odd numbered gathering.

On this alternating angular displacement about the axis $y$—$y$, is superposed, for the gathering operation, a downward and upward movement of the parison mould, comprising a substantially vertical translation which is produced, in the example of the drawing, by the co-operation of two cam-ways 31—32 of identical profiles provided on a lower carriage 33 which is adapted to move alternately in the direction of the arrows and on which rest, on the one hand the column 19 by means of a roller 34, and on the other hand a second supporting column 35 by means of a roller 36. Said column 35, which is guided in a sleeve 37, is provided at the upper part thereof with the race 30 and has a projecting member 38 which acts as a guide for the shaft 23 that controls the angular displacement.

This vertical translatory movement of the parison mould takes place either during the angular displacement, or only when the bars 7—7 have reached their extreme positions shown in Figs. 2 and 3, but in any case without inclining the parison mould during its downward movement towards the surface of the glass.

The power means for operating the lazy-tongs device 16, the rack 21, and the carriage 33 may comprise any conventional type of power means, such as double-acting air cylinders conventionally used in this art, it being noted that Fig. 1 of the drawings shows an operating shaft for three of these devices, while the showing for the lazy-tongs device 16 is incomplete. These shafts may comprise the piston rods for the air cylinders and such cylinders may be operated in the desired timed relationship by providing an electric motor for driving a drum carrying cams or dogs which are arranged to operate the valves for the various air cylinders in the desired timed relationship.

What I claim is:

1. In an automatic machine for the manufacture of hollow glass articles such as bottles, flasks and the like, a device for the dipping of glass in a glass-working furnace, through an opening in the said furnace, comprising a base, a column mounted on the said base and capable of being angularly displaced about its own axis relative to the said base, at least one guideway carried by the said column, a carriage movable along the said guideway, a parison mould carried by the said carriage, a support for the part of the said guideway placed opposite to the furnace relatively to the said column, the said support allowing for the angular displacement of the said guideway, means for imparting to the said carriage on the said guideway a reciprocating movement ensuring the penetration of the said mould into the furnace for the dipping of the mould into the glass and its withdrawal from the furnace, means for imparting to the said guideway an intermittent angular displacement which occurs about the axis of the said column and alternatively on both sides of the axis of the said furnace opening during the penetration of the said mould into the furnace, and means for simultaneously imparting to the said column and the said support a vertical translation movement alternatively downwards and upwards in order to lower the said mould to the surface of glass and to raise the said mould above the said surface after the dipping of a parison.

2. In an automatic machine for the manufacture of hollow glass articles such as bottles, flasks and the like, a device for dipping the glass in a glass-working furnace through an opening in the said furnace, comprising a base, a column mounted on the said base and capable of being angularly displaced about its own axis relative to the said base, at least one guideway carried by the said column, a carriage movable along the said guideway, a parison mould carried by the said carriage, a support for the part of the said guideway placed opposite to the furnace relatively to the said column, the said support allowing for the angular displacement of the said guideway, means for imparting to the said carriage on the said guideway a reciprocating movement ensuring the penetration of the said mould into the furnace for the dipping of the mould into the glass and its withdrawal from the furnace, means for imparting to the said guideway an intermittent angular displacement which occurs about the axis of the said column and alternatively on both sides of the axis of the said opening of the furnace during the penetration of the said mould into the furnace, a lower carriage reciprocable in the said base and on which rest the said column and the said support, and a camway on the said carriage for the column and of the support for effecting their vertical movement.

ROBERT ERNEST COMTE.

REFERENCES CITED

The following references are of record in the file of this patent:

UNITED STATES PATENTS

| Number | Name | Date |
|---|---|---|
| 154,919 | Slayter | Sept. 8, 1874 |
| 2,150,637 | Schutz | Mar. 14, 1939 |
| 2,425,592 | Bowe | Aug. 12, 1947 |

FOREIGN PATENTS

| Number | Country | Date |
|---|---|---|
| 65,355 | Norway | Oct. 19, 1942 |
| 119,749 | Great Britain | Oct. 17, 1918 |
| 612,033 | Great Britain | Nov. 8, 1948 |